United States Patent [19]

Lindner

[11] Patent Number: 4,530,857

[45] Date of Patent: Jul. 23, 1985

[54] GLASS CONTAINER HOT END COATING FORMULATION AND METHOD OF USE

[75] Inventor: Georg H. Lindner, Vlissingen, Netherlands

[73] Assignee: M&T Chemicals Inc., Woodbridge, N.J.

[21] Appl. No.: 494,242

[22] Filed: May 13, 1983

[51] Int. Cl.³ .............................................. B05D 3/02
[52] U.S. Cl. ................................... 427/314; 65/60.52; 106/287.19; 427/421
[58] Field of Search ...................... 427/314, 376.2, 427, 427/421, 126.2, 126.3, 110, 226; 106/287.19; 65/60.52

[56] References Cited

U.S. PATENT DOCUMENTS

| | | | |
|---|---|---|---|
| 2,567,331 | 9/1951 | Gaiser et al. | 427/110 |
| 2,614,944 | 10/1952 | Lytle | 427/110 |
| 2,617,741 | 10/1952 | Lytle | 427/110 |
| 3,019,136 | 1/1962 | Auffenorde et al. | 427/110 |
| 4,130,673 | 12/1978 | Larkin | 427/255 |
| 4,144,362 | 3/1979 | Larkin | 427/255 |
| 4,235,945 | 11/1980 | Wagner | 427/314 |
| 4,370,028 | 1/1983 | Beinhardt | 427/126.3 |
| 4,389,234 | 6/1983 | Lindner | 65/60.1 |

*Primary Examiner*—S. L. Childs
*Attorney, Agent, or Firm*—S. H. Parker; J. Matalon; R. E. Bright

[57] ABSTRACT

The invention relates to a stabilized composition for coating glass containers, and to its method of use. The method involves the steps of heating the surface of a glass container to at least 800° F., and spraying the surface of the glass with a glass coating formulation comprising monoalkyltin trihalide and about 0.5 to 10 parts by weight per hundred parts monoalkyltin trihalide of a solubilizing material.

12 Claims, No Drawings

GLASS CONTAINER HOT END COATING FORMULATION AND METHOD OF USE

BACKGROUND OF THE INVENTION

Cross-Reference to Related Patent Applications

The instant invention relates to a process which is fully described in U.S. Pat. Nos. 4,130,673 and 4,144,362 and requires for the optimization of performance, the equipment described in copending U.S. patent application No. 359,441, filed Mar. 18, 1982, now U.S. Pat. No. 4,389,234 and U.S. patent application No. 385,176, filed June 4, 1982, U.S. Pat. No. 4,500,264, the subject matter of which is incorporated herein by reference.

TECHNICAL FIELD

This application relates to the hot end coating of glass containers with an alkyl tin halide formulation, such as monobutyltin trichloride, and more particularly to the prevention of the formation of solids in such formulations.

DESCRIPTION OF THE PRIOR ART

Glass coating systems of the prior art have been known to exhibit certain shortcomings and problems. Among the prior art problems is the inability to obtain uniform coatings, the difficulty of monitoring the operation in order to rapidly observe a system failure and take corrective steps, and high levels of corrosion of not only the coating equipment, but also nearby equipment and even the roof of the building in which the system is housed. One approach has been a system in which monobutyl tin trichloride is used as the coating material. The process as disclosed in U.S. Pat. Nos. 4,130,673 and 4,144,362 has provided many of the desired improvements. However, the high material cost of monobutyl tin trichloride and the extremely low quantity of material which is used, has necessitated the development of unique equipment for use in the process. U.S. patent application No. 385,176, filed June 4, 1982, and U.S. patent application No. 359,441, filed Mar. 18, 1982, disclose equipment which has permitted greater optimization of the process.

Although monobutyl tin trichloride is a product which is commercially available at a high purity level, problems have been encountered due to the unpredictable and erratic appearance of solid particles in the monobutyl tin trichloride. Unfortunately, the problems associated with the particles are either exacerbated or not overcome by the use of the unique equipment. A process problem can result in the loss of hundreds or thousand of bottles and processing time.

The problems encountered with monobutyl tin trichloride are typically substantially less than those encountered with other materials, such as titanium tetrachloride. Nevertheless, the losses are still above the desired level.

Attempts to eliminate or even minimize the problems associated with the appearance of solid particles has been thwarted by the erratic nature of the problem. The process has been found to run without difficulty at times for months, and in other instances problems were encountered soon after start up of the operation.

While the reduction of precipitation or crystallization to tolerable levels is laudable, the cost of any system shut down is so high that the required goal must be the total elimination of the system failure due to the presence of solid particles. Equipment redesign is a possible method of preventing system shut down in the presence of crystal. However, the coating system lines, spray outlet ports, metering mechanism and other equipment have such extremely small diameter that they do lend themselves to economical redesign and are extremely sensitive to the presence of even ultrafine particles.

SUMMARY OF THE INVENTION

It has now been found that the problems encountered with the prior art systems can be overcome by doping a monoalkyltin trihalide glass coating formulation such as monobutyltin trichloride with materials having specific solvent characteristics.

In accordance with the present invention, glass bottles are coated preferably with a monoalkyltin trihalide glass coating material doped with from about 0.5 to about 10 parts by weight of a material selected from the group consisting of monohydric alcohols represented by the formula ROH, where R is a $C_1$-$C_8$ straight or branched chain group; dihydric alcohols represented by the formula, $HO-(CH_2)_m-OH$, where $m=2$ to 6; glycol ethers represented by the formula, $R^1-(OCH_2CH_2)_nOH$, where $R^1$ is a $C_1$-$C_8$ group and $n=1$ or 2; esters represented by the formula, $R^2O_2CR^3$, where $R^2$ is a $C_1$-$C_8$ straight or branched chain group, $R^4(OCH_2CH_2)_s$ where $R^4$ is a $C_1$-$C_4$ group, $s=1$ or 2, and $R^3$ is a $C_1$-$C_4$ group or $-CH_2OH$; ketones having the formula, $R^5COR^6$, where $R^5$ and $R^6$ are $C_1$-$C_6$ straight, branched chain or cyclic groups; ethers represented by the formula, $R^7(OCH_2CH_2)_rOR^8$ where $R^7$ and $R^8$ are $C_1$-$C_4$ groups or $-(CH_2)_p-$ where $p=4$ or 5, or $-CH_2CH_2OCH_2CH_2-$, and $r=0$–4; aldehydes represented by the formula, $R^9COH$, where $R^9$ is $C_1$-$C_3$; anhydrides represented by the formula, $R^{10}CO_2COR^{11}$, where $R^{10}$ and $R^{11}$ are a $C_1$-$C_3$ group; formamides represented by the formula, $R^{12}R^{13}NCOH$, where $R^{12}$ and $R^{15}$ are a $C_1$-$C_4$ group; acetals represented by the formula, $R^{14}(CH_2)_qCH(OR^{15})_2$, where $R^{14}$ is H, OH, $(CH_3)_2N$, or $(C_2H_5)_2N$, $q=0$ or 1, and $R^{15}$ is a $C_1$-$C_2$ group or a nitrile, $R^{16}CN$ where $R^{16}$ is a $C_1$-$C_3$ group and mixtures thereof.

The combination of the dopant and the glass coating material has a flash point of at least 60° C. and is a solvent for stannic chloride pentahydrate the solid believed to be the cause of problems. The coating operation is carried out at a temperature in the range of from 800 to 1200 degrees F. and can be followed by a cold end coating and/or coating material recovery step or steps.

DESCRIPTION OF THE INVENTION INCLUDING THE BEST MODE

The glass coating process can best be understood by reference to U.S. Pat. Nos. 4,130,673 and 4,144,362. U.S. patent application No. 385,176 filed June 4, 1982, and U.S. patent application No. 359,441 filed Mar. 18, 1982, wherein the process steps and apparatus are fully described.

The glass coating materials can be monoalkyltin trihalide wherein the alkyl group has 1 to 8 carbons and the halide is preferably chlorine. The optimum material is monobutyltin trichloride, although adequate results can be obtained with methyltin trichloride, ethyltin trichloride, propyltin trichloride, pentyltin trichloride, hexyltin trichloride, heptyltin trichloride, octyltin trichloride or 2-ethylhexyltin trichloride.

It should be noted that even in instances where the analysis of monobutyltin trichloride coating material failed to reveal the presence of detectable levels of impurities which could produce the observed particles or crystals, upon occasion the use of such coating material resulted in particle formation. It is not known whether the particle formation is due to some inherent impurity in the organotin at low concentrations or to the contamination of the material before or during the coating process.

Whatever the reason for the problem, it has been found that the coating composition can be stabilized by means of the addition to the monobutyltin trichloride of between about 0.5 and 10 parts by weight of a dopant. The coating material additive is referred to herein as a dopant since it would ordinarily be considered an impurity and does not contribute in any positive way to the coating process or the quality of the final coating.

Among the materials the use of which prevented the appearance or accumulation of solid particles in the monobutyltin trichloride, are certain alcohols, glycols, glycol ethers, esters, ketones, ethers, aldehydes, anhydrides, formamides, acetals or nitriles.

The dopants can be defined as monohydric alcohols represented by the formula ROH, where R is a $C_1$-$C_8$ straight or branched chain group; dihydric alcohols represented by the formula, $HO$—$(CH_2)_m$—$OH$, where $m=2$ to 6; glycol ethers represented by the formula, $R^1$—$(OCH_2CH_2)_nOH$, where $R^1$ is a $C_1$-$C_8$ group and $n=1$ or 2; esters represented by the formula, $R^2O_2CR^3$, where $R^2$ is a $C_1$-$C_8$ straight or branched chain group, $R^4(OCH_2CH_2)_s$ where $R^4$ is a $C_1$-$C_4$ group, $s=1$ or 2, and $R^3$ is a $C_1$-$C_4$ group or —$CH_2OH$; ketones having the formula, $R^5COR^6$, where $R^5$ and $R^6$ are $C_1$-$C_6$ straight, branched chain or cyclic groups; ethers represented by the formula, $R^7(OCH_2CH_2)_rOR^8$ where $R^7$ and $R^8$ are $C_1$-$C_4$ groups or —$(CH_2)_p$— where $p=4$ or 5, or —$CH_2CH_2OCH_2CH_2$—, and $r=0-4$; aldehydes represented by the formula, $R^9COH$, where $R^9$ is $C_1$-$C_3$; anhydrides represented by the formula, $R^{10}CO_2COR^{11}$, where $R^{10}$ and $R^{11}$ are a $C_1$-$C_3$ group; formamides represented by the formula, $R^{12}R^{13}NCOH$, where $R^{12}$ and $R^{13}$ are a $C_1$-$C_4$ group; acetals represented by the formula, $R^{14}(CH_2)_qCH(OR^{15})_2$, where $R^{14}$ is H, OH, $(CH_3)_2N$, or $(C_2H_5)_2N$, $q=0$ or 1, and $R^{15}$ is a $C_1$-$C_2$ group or a nitrile, $R^{16}CN$ where $R^{16}$ is a $C_1$-$C_3$ group, and mixtures thereof.

Suitable examples of the dopant are methanol, ethanol, propanol, isopropanol, n-, sec-, iso- and tertiary butanol, pentanol, hexanol, heptanol, octanol, ethylene glycol, propylene glycol, hexylene glycol, butyl sorbitol, butyl cellosolve, corbitol, cellosolve, hexyl sorbitol, hexyl cellosolve, methyl sorbitol, methyl cellosolve, methyl acetate, ethyl acetate, butyl acetate, 2-butyl acetate, amyl acetate, butyl sorbitol acetate, butyl cellosolve acetate, sorbitol acetate, cellosolve acetate, 2-ethylhexyl acetate, glycol diacetate, hexyl sorbitol acetate, isobutyl acetate, n-propyl acetate, methyl sorbitol acetate, propyl acetate, butyl glucolate, acetone, cyclohexanone, di-iso-butyl ketone, iso-butyl heptyl ketone, methyl ethyl ketone, methyl isobutyl ketone, methyl m-amyl ketone, methyl n-butyl ketone, diethyl ether, dibutyl ether, tetrahydrofuran, tetrahydropyran, dioxane, glyme, diglyme, triglyme, tetraglyme, ethylglyme, ethyl diglyme, ethyltriglyme, ethyltetraglyme, acetaldehyde, propionaldehyde, butyraldehyde, acetic anhydride, propionic anhydride, butyric anhydride, dimethyl formamide, diethylformamide, dipropylformamide, dibutylformamide, acetal, dimethoxymethane, 2,2-diethoxyethanol, N,N-dimethylformamide diethyl acetal, N,N-dimethylacetamide diethyl acetal, acetonitrile, propionitrile and butyronitrile among others.

It is assumed that the dopant functions as a solvent for the particles and either maintains the particles in solution or "resolubilizes" the particles when they come out of solution. It should be understood that the discussion of the theory of the invention is provided for completeness of disclosure and is not intended to be a limitation of the invention nor is it intended to be representative of the only possible explanation of the problem.

The concentration levels of the dopant must be low enough to avoid the possibility of undesirable side effects in a sensitive process, not adversely affect flammability, corrosiveness, flash point or viscosity and must be non-reactive with the coating material. The dopant must be inexpensive since it produces a cost increase without a productivity increase.

Some examples of effective dopants are listed in Table I. They are in no way to be construed as limiting examples of this invention. Although at least a few percent by weight of water can dissolve the particles which upon occasion contaminate the coating material, the resultant product is cloudy and very corrosive to metals. Solids were induced in butyltin trichloride by adding 0.1% water followed by various amounts of stannic chloride. Solids formed immediately and the mixture stood 18 hours before the dopants were added. A specific weight of dopant was added and the mixture was agitated for 5 minutes. If in that time the solids did not dissolve the dopant level was considered not effective and levels were increased. When an effective level was found, the clear solutions were allowed to stand 18 hours to determine if solids would reappear.

TABLE I

| % Effective Dopants for Butyltin Trichloride Solids | |
| --- | --- |
| Dopant | Wt. % |
| Methanol | 0.5[2], 1.0, 1.1[3] |
| Ethanol | 1.6[3] |
| Propanol | 2.0[3] |
| Butanol | 3.9[3] |
| Ethylene glycol | 1.1[3], 4.2[3] |
| Propylene glycol | 4.2[3] |
| Butyl cellosolve | 1.0 |
| Diethyl ether | 1.5[3] |
| Dibutyl ether | 3.0[3] |
| Tetrahydrofuran | 2.6[3] |
| Butyl glycolate | 3.0[3] |
| Butyl acetate | 8.0 |
| Methyl ethyl ketone | 4.0 |
| Methyl isobutyl ketone | 6.0 |
| Acetaldehyde | 7.0 |
| Acetic anhydride | 1.3 |
| Dimethylformamide | 2.0 |
| Dimethylaminoacetaldehyde diethyl acetal | 1.5 |
| Acetonitrile | 3.0 |

[1]BuSnCl$_3$ contains 0.1% added H$_2$O and 0.4% added SnCl$_4$.
[2]BuSnCl$_3$ contained 0.25% SnCl$_4$.
[3]BuSnCl$_3$ contained 0.75% SnCl$_4$.

What is claimed is:

1. The method of coating glass containers, comprising the steps of:
   (a) heating the surface of a glass container to at least 800° F.;
   (b) spraying the surface of the glass with a glass coating formulation which is stable with respect to the appearance of solid particles during storage and use thereof comprising monoalkyltin trihalide and about 0.5 to 10 parts by weight per hundred parts monoalkyltin trihalide of a dopant selected from the group consisting of:

monohydric alcohols represented by the formula ROH where R is a $C_1$–$C_8$ straight or branched chain group; dihydric alcohols represented by the formula, HO—$(CH_2)_m$—OH, where m=2 to 6; glycol ethers represented by the formula, $R^1$—$(OCH_2CH_2)_n$OH, where $R^1$ is a $C_1$–$C_8$ group and n=1 or 2; ethers represented by the formula, $R^2O_2CR^3$, where $R^2$ is a $C_1$–$C_8$ straight or branched chain group, $R^4(OCH_2CH_2)_s$ where $R^4$ is a $C_1$–$C_4$ group, s=1 or 2, and $R^3$ is a $C_1$–$C_4$ group or —$CH_2OH$; ketones having the formula, $R^5COR^6$, where $R^5$ and $R^6$ are $C_1$–$C_6$ straight, branched chain or cyclic groups, esters represented by the formula, $R^7(OCH_2CH_2)_rOR^8$ where $R^7$ and $R^8$ are $C_1$–$C_4$ groups or —$(CH_2)_p$— where p=4 or 5, or —$CH_2CH_2OCH_2CH_2$—, where r=0–4; aldehydes represented by the formula $R^9COH$, where $R^9$ is $C_1$–$C_3$; anhydrides represented by the formula, $R^{10}CO_2COR^{11}$, where $R^{10}$ and $R^{11}$ are a $C_1$–$C_3$ group; formamides represented by the formula, $R^{12}R^{13}NCOH$, where $R^{12}$ and $R^{13}$ are a $C_1$–$C_4$ group; and acetals represented by the formula, $R^{14}(CH_2)_qCH(OR^{15})_2$, where $R^{14}$ is H, OH, $(CH_3)_2N$, or $(C_2H_5)_2N$, q=0 or 1, and $R^{15}$ is a $C_1$–$C_2$ group or a nitrile, $R^{16}CN$ where $R^{16}$ is a $C_1$–$C_3$ group, and mixtures thereof and wherein the combination of the dopant and the glass coating material has a flash point of at least 60° C. said material preventing the appearance of solid particles without adversely affecting the quality of the final coating.

2. The method of claim 1, wherein the dopant is selected from the group consisting of methanol, ethanol, propanol, and isopropanol, and mixtures thereof.

3. The method of claim 1 wherein the dopant is an alcohol selected from the group consisting of monohydric alcohols.

4. The method of claim 3 wherein the alcohol is selected from the group consisting of methanol, ethanol, propanol, isopropanol, n-, sec-, iso- and tertiary butanol, pentanol, hexanol, heptanol, octanol, and mixtures thereof.

5. A stabilized composition for use in the forming of a tin oxide coating on glass at a temperature of at least 800° F. comprising monoalkyltin trihalide and about 0.5 to 10 parts by weight per hundred parts monoalkyltin trihalide of a dopant selected from the group consisting of: monohydric alcohols represented by the formula ROH, where R is a $C_1$–$C_8$ straight or branched chain group; dihydric alcohols represented by the formula, HO—$(CH_2)_m$—OH, where m=2 to 6; glycol ethers represented by the formula, $R^1$—$(OCH_2CH_2)_n$OH, where $R^1$ is a $C_1$–$C_8$ group and n=1 or 2; esters represented by the formula, $R^2O_2CR^3$, where $R^2$ is a $C_1$–$C_8$ straight or branched chain group, $R^4(OCH_2CH_2)_s$ where $R^4$ is a $C_1$–$C_4$ group, s=1 or 2, and $R^3$ is a $C_1$–$C_4$ group or —$CH_2OH$; ketones having the formula, $R^5COR^6$, where $R^5$ and $R^6$ are $C_1$–$C_6$ straight, branched chain or cyclic groups; ethers represented by the formula, $R^7(OCH_2CH_2)_rOR^8$ where $R^7$ and $R^8$ are $C_1$–$C_4$ groups or —$(CH_2)_p$— where p=4 or 5, or —$CH_2CH_2OCH_2CH_2$—, where r=0–4; aldehydes represented by the formula, $R^9COH$, where $R^9$ is $C_1$–$C_3$; anhydrides represented by the formula, $R^{10}CO_2COR^{11}$, where $R^{10}$ and $R^{11}$ are a $C_1$–$C_3$ group; formamides represented by the formula, $R^{12}R^{13}NCOH$, where $R^{12}$ and $R^{13}$ are a $C_1$–$C_4$ group; and acetals represented by the formula, $R^{14}(CH_2)_qCH(OR^{15})_2$, where $R^{14}$ is H, OH, $(CH_3)_2N$, or $(C_2H_5)_2N$, q=0 or 1, and $R^{15}$ is a $C_1$–$C_2$ group or a nitrile, $R^{16}CN$ where $R^{16}$ is a $C_1$–$C_3$ group, and mixtures thereof and wherein the combination of the dopant and the glass coating material has a flash point of at least 60° C.

6. The stabilized composition of claim 5, wherein said dopant is a dihydric alcohol.

7. The stabilized composition of claim 6, wherein said dihydric alcohol is selected from the group consisting of ethylene glycol, propylene glycol, hexylene glycol, butyl sorbitol, butyl cellosolve, sorbitol, cellosolve, hexyl sorbitol, hexyl cellosolve, methyl sorbitol, methyl cellosolve, methyl acetate, ethyl acetate, butyl acetate, 2-butyl acetate, amyl acetate, butyl sorbitol acetate, butyl cellosolve acetate, sorbitol acetate, cellosolve acetate, 2-ethylhexyl acetate, glycol diacetate, hexyl sorbitol acetate, isobutyl acetate, n-propyl acetate, methyl sorbitol acetate, propyl acetate, butyl glucolate, acetone, cyclohexanone, di-iso-butyl ketone, iso-butyl heptyl ketone, methyl ethyl ketone, methyl isobutyl ketone, methyl m-amyl ketone, methyl n-butyl ketone, diethyl ether, dibutyl ether, tetrahydrofuran, tetrahydropyran, dioxane, glyme, diglyme, triglyme, tetraglyme, ethylglyme, ethyl diglyme, ethyltriglyme, ethyltetraglyme, acetaldehyde, propionaldehyde, butyraldehyde, acetic anhydride, propionic anhydride, butyric anhydride, dimethyl formamide, diethylformamide, dipropylformamide, dibutylformamide, acetal, dimethoxymethane, 2,2-diethoxyethanol, N,N-dimethylformamide diethyl acetal, N,N-dimethylacetamide diethyl acetal, acetonitrile, propionitrile and butyronitrile.

8. The stabilized composition of claim 5, wherein said dopant is a monohydric alcohol.

9. The stabilized composition of claim 5, wherein the dopant is selected from the group consisting of methanol, ethanol, propanol, and isopropanol, and mixtures thereof.

10. The stabilized composition of claim 5, wherein the alcohol is selected from the group consisting of methanol, ethanol, propanol, isopropanol, n-, sec-, iso- and tertiary butanol, pentanol, hexanol, heptanol, octanol, and mixtures thereof.

11. The stabilized composition of claim 5, wherein the monoalkyltin trihalide is monobutyltin trichloride.

12. The stabilized composition of claim 5, wherein the monoalkyltin trihalide is a $C_1$ to $C_8$ alkyltin trichloride.

* * * * *